(12) United States Patent
Krishnamoorti et al.

(10) Patent No.: US 8,455,583 B2
(45) Date of Patent: *Jun. 4, 2013

(54) CARBON NANOTUBE REINFORCED POLYMER NANOCOMPOSITES

(75) Inventors: Ramanan Krishnamoorti, Bellaire, TX (US); Cynthia A. Mitchell, Houston, TX (US); Jeffrey L. Bahr, Houston, TX (US)

(73) Assignee: University of Houston, Houston, TX (US)

( * ) Notice: Subject to any disclaimer, the term of this patent is extended or adjusted under 35 U.S.C. 154(b) by 1075 days.

This patent is subject to a terminal disclaimer.

(21) Appl. No.: 11/659,407

(22) PCT Filed: Aug. 2, 2005

(86) PCT No.: PCT/US2005/027317
§ 371 (c)(1),
(2), (4) Date: Feb. 2, 2007

(87) PCT Pub. No.: WO2006/096203
PCT Pub. Date: Sep. 14, 2006

(65) Prior Publication Data
US 2009/0030090 A1    Jan. 29, 2009

Related U.S. Application Data

(60) Provisional application No. 60/598,090, filed on Aug. 2, 2004.

(51) Int. Cl.
C08K 3/04    (2006.01)

(52) U.S. Cl.
USPC ........... 524/496; 524/495; 977/742; 977/745; 977/746; 977/748; 977/753

(58) Field of Classification Search
USPC ................................. 524/495, 496
See application file for complete search history.

(56) References Cited

U.S. PATENT DOCUMENTS

| 2003/0139518 A1 | 7/2003 | Miyoshi et al. |
| 2009/0321688 A1 | 12/2009 | Saitoh |

FOREIGN PATENT DOCUMENTS

| EP | 1336673 A1 | 8/2003 |
| EP | 1428793 A1 | 6/2004 |
| EP | 1439248 A1 | 7/2004 |
| EP | 2113302 A1 | 11/2009 |
| JP | 2003238816 | 8/2003 |
| WO | WO 0187193 A1 * | 11/2001 |
| WO | WO 0192381 A1 * | 12/2001 |
| WO | 02/37507 A1 | 5/2002 |
| WO | 02/060812 | 8/2002 |
| WO | WO 03060941 A2 * | 7/2003 |
| WO | 03/069032 | 8/2003 |
| WO | 2004024428 A1 | 3/2004 |
| WO | 2004/097853 A1 | 11/2004 |
| WO | 2004097853 | 11/2004 |

OTHER PUBLICATIONS

Gong, Xiaoyi, Jun Liu, Suresh Bakaran, Roger D. Voise, and James S. Young. Surfactant-Assistaed Processing of Carbon Nanotube/Polymer Composites. (Mar. 17, 2000) Chemical Materials 12, pp. 1049-1052.*

Grady, Brian P., Francisco Pompeo, Robert L. Shambaugh, and Daniel E. Resasco. Nucleation of Polypropylene Crystallization by Single-Walled Carbon Nanotubes. (May 21, 2002) Journal of Physical Chemistry B, 106, pp. 5852-5858.*

Zhang, X. et al., "Poly(vinyl alcohol)/SWNT Composite Film", Nano Letters, vol. 3., No. 9, Aug. 15, 2003, pp. 1285-1288.

European Patent Office communication pursuant to Article 94(3) EPC, application No. 05857557.2, Dec. 19, 2008.

Response to European Patent Office communication pursuant to Article 94(3) EPC, application No. 05857557.2, Jun. 19, 2009.

European Patent Office communication pursuant to Article 94(3) EPC, application No. 05857557.2, Apr. 20, 2010.

Shi, Xinfeng et al., "Rheological behaviour and mechanical characterization of injectable poly(propylene fumarate)/ single-walled carbon nanotube composites for bone tissue engineering", Institute of Physics Publishing, Nanotechnology 16 (2005) S531-S538.

Krishnamoorti, Ramanan, et al., "Crystallization of Semi-Crystalline Polymer in Nanotube Composites", Presented at the spring 167th Technical Meeting of the Rubber Division, American Chemical Society, San Antonio, TX, May 16-18, 2005. Paper No. 65.

* cited by examiner

*Primary Examiner* — Ling Choi
*Assistant Examiner* — Darcy D Laclair Lynx
(74) *Attorney, Agent, or Firm* — Winstead PC

(57) ABSTRACT

The present invention is directed to carbon nanotube (CNT)/polymer composites, i.e., nanocomposites, wherein the CNTs in such nanocomposites are highly dispersed in a polymer matrix, and wherein the nanocomposites comprise a compatibilizing surfactant that interacts with both the CNTs and the polymer matrix. The present invention is also directed to methods of making these nanocomposites. In some such methods, the compatibilizing surfactant provides initial CNT dispersion and subsequent mixing with a polymer. The present invention is also directed to methods of using these nanocomposites in a variety of applications.

30 Claims, 11 Drawing Sheets

Table 1

| Sample | wt. % SWNT | Carbon per Functional Group |
|---|---|---|
| PCL | 0 | 0 |
| PCL01A | 0.1 | 70 |
| PCL02A | 0.2 | 70 |
| PCL04A | 0.4 | 70 |
| PCL08A | 0.8 | 70 |
| PCL02B | 0.2 | 125 |
| PCL04C | 0.4 | 1 |

*Fig. 1*

CARBON NANOTUBE REINFORCED POLYMER NANOCOMPOSITES

CROSS-REFERENCE TO RELATED APPLICATIONS

This Application for patent claims priority to U.S. Provisional Patent Application Ser. No. 60/598,090, filed Aug. 2, 2004.

FEDERALLY-SPONSORED RESEARCH

The present invention was made in part with support from the National Aeronautics and Space Administration, grant number NAG9-1305.

FIELD OF THE INVENTION

The present invention relates generally to highly-dispersed carbon nanotube-based polymer nanocomposites. The present invention relates more specifically to a unique physical-chemical method to develop super-strength and ultra-lightweight fibers and bulk nanocomposites of nylon, polyester and other high-performance polymers and also development of a new class of biodegradable and biocompatible polymer composites based on biodegradable polymers with enhanced mechanical properties.

BACKGROUND OF THE INVENTION

Development of carbon nanotube (CNT)-based, and particularly single-wall carbon nanotube (SWNT)-based, polymer nanocomposites is attractive because of the possibility of combining the extraordinary properties of CNTs with the lightweight character of polymers to develop unique, tailorable materials. CNTs possess tensile strengths of 37 GPa, estimated Young's moduli of 640 GPa (Baughman et al., *Science* 2002, 297, 787-792), and high strains-at-break (~5-6%). Further, when released from strain, bent CNTs generally recover their original form without direct fracture (Walters et al., *Appl. Phys. Lett.*, 1999, 74, 3803-3805).

On the basis of the above-mentioned extraordinary mechanical properties and the large aspect ratio associated with individual tubes (typically ~$10^3$-$10^4$), CNTs are excellent candidates for the development of nano-reinforced polymer composite materials. However, assurance of homogeneous dispersion, interfacial compatibility between the CNT and the polymer, and exfoliation of the aggregates (i.e., bundles) of CNTs, are required for the successful integration of CNTs into nanocomposites. Accordingly, a detailed examination of dispersion of CNTs in solutions and in various model polymeric systems would go a long way in enabling the tailoring of extremely lightweight multifunctional materials that could find use in applications ranging from hip replacements to space travel.

BRIEF DESCRIPTION OF THE INVENTION

The present invention is directed to carbon nanotube (CNT)/polymer composites, referred to herein as "nanocomposites," wherein the CNTs in such nanocomposites are highly dispersed in a polymer matrix, and wherein the nanocomposites comprise a compatibilizing surfactant that interacts with both the CNTs and the polymer matrix. The present invention is also directed to methods of making these nanocomposites. In some such methods, the compatibilizing surfactant provides initial CNT dispersion and subsequent mixing with a polymer. The present invention is also directed to methods of using these nanocomposites in a variety of applications.

Several studies for developing well-dispersed CNT/polymer nanocomposites have been undertaken by Applicants, and the present invention highlights the use of interacting surfactants as a method to compatibilize the CNTs with a polymer matrix. A novel aspect of the present invention is the use of surfactants with chemical groups that are able to establish strong attractive interactions with both the CNTs and with the polymer matrix, so as to establish polymer nanocomposites using these materials in small amounts.

In a exemplary embodiment, single wall carbon nanotubes (SWNTs) were dispersed in poly($\epsilon$-caprolactone) (PCL) with the aid of a zwitterionic surfactant. Melt-rheology and electrical conductivity measurements indicate hydrodynamic manifestation of geometrical percolation and electrical percolation, respectively, for nanocomposites with 0.1 wt % SWNT, implying an effective anisotropy of at least 500. Fourier transform infrared (FTIR) spectroscopy measurements, and comparison of dispersion using other surfactants, established that the excellent dispersion is a result of favorable interactions between the polymer and the surfactant and the surfactant and the nanotubes. The presence of well-dispersed SWNTs results in a strong nucleation effect on the crystallization of PCL, with a saturation in the nucleation effect beyond 0.1 wt %.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 (Table 1) lists exemplary nanocomposite compositions, in accordance with some embodiments of the present invention;

DETAILED DESCRIPTION OF THE INVENTION

Figure 2:
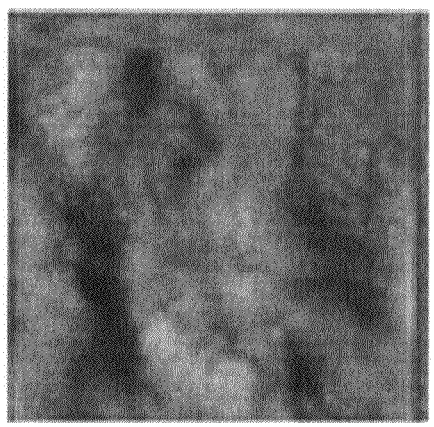
FIGS. 2A and 2B are AFM images in tapping mode for PCL (2A) and PCL04A (2B)
Figure 2:
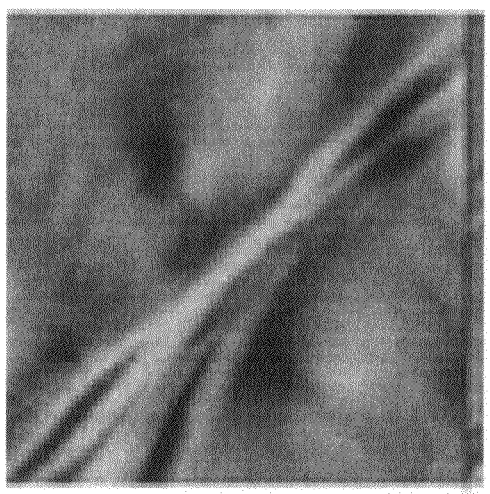

The present invention is directed to carbon nanotube (CNT)/polymer composites, referred to herein as "nanocomposites," wherein the CNTs in such nanocomposites are highly dispersed in a polymer matrix, and wherein the nanocomposites comprise a compatibilizing surfactant that interacts with both the CNTs and the polymer matrix. The present invention is also directed to methods of making these nanocomposites, and also to methods of using these nanocomposites in a variety of applications.

Carbon nanotubes (CNTs), according to the present invention, include, but are not limited to, single-wall carbon nanotubes (SWNTs), multi-wall carbon nanotubes (MWNTs), double-wall carbon nanotubes (DWNTs), buckytubes, small-diameter carbon nanotubes, fullerene tubes, tubular fullerenes, graphite fibrils, carbon nanofibers, and combinations thereof. Such carbon nanotubes can be of a variety and range of lengths, diameters, number of tube walls, chiralities (helicities), etc., and can be made by any known technique including, but not limited to, arc discharge (Ebbesen, *Annu. Rev. Mater. Sci.* 1994, 24, 235-264), laser oven (Thess et al., *Science* 1996, 273, 483-487), flame synthesis (Vander Wal et al., *Chem. Phys. Lett.* 2001, 349, 178-184), chemical vapor deposition (U.S. Pat. No. 5,374,415), wherein a supported (Hafner et al., *Chem. Phys. Lett.* 1998, 296, 195-202) or an unsupported (Cheng et al., *Chem. Phys. Lett.* 1998, 289, 602-610; Nikolaev et al., *Chem. Phys. Lett.* 1999, 313, 91-97) metal catalyst may also be used, and combinations thereof. Depending on the embodiment, the CNTs can be subjected to one or more processing steps. In some embodiments, the CNTs have been purified. Exemplary purification techniques include, but are not limited to, those by Chiang et al. (Chiang et al., *J. Phys. Chem. B* 2001, 105, 1157-1161; Chiang et al., *J. Phys. Chem. B* 2001, 105, 8297-8301). In some embodiments, the CNTs have been cut by a cutting process. See, e.g., Liu et al., *Science* 1998, 280, 1253-1256; and Gu et al., *Nano Lett.* 2002, 2(9), 1009-1013. The terms "carbon nanotube" and "nanotube" are used interchangeably herein.

In referring to CNTs dispersed in a liquid solvent, the terms "solution" and "dispersion" are used interchangeably, unless otherwise indicated. Applicants note that such solutions are typically not true solutions in the thermodynamic sense. Additionally, the term "dispersion" is also used herein to refer to the degree to which CNTs are dispersed in a polymer matrix in a polymer nanocomposite of the present invention.

In some embodiments, the present invention is generally directed to polymer nanocomposites comprising: (a) CNTs; (b) a polymer matrix in which the CNTs are dispersed; and (c) a compatibilizing surfactant, wherein said surfactant interacts with both the CNTs and the polymer matrix. Such interaction of the surfactant with the CNTs and the polymer matrix generally involves interactions stronger than mere van der Waals attractive forces. Such interactions include, but are not limited to, ionic bonding, covalent bonding, electrostatic interactions, hydrogen bonding, and the like.

In some such embodiments, such CNTs include purified CNTs, unpurified CNTs (raw, as-produced), and combinations thereof. In some such embodiments, the CNTs are selected from the group consisting of SWNTs, MWNTs, carbon nanofibers, and combinations thereof (see above). Generally, the amount of such CNTs in the polymer nanocomposites ranges from about 0.0001 wt. % to about 90 wt. %.

In some embodiments, at least some of the CNTs are functionalized in a manner selected from the group consisting of sidewall functionalization, end functionalization, and combinations thereof (Chen et al., *Science*, 1998, 282, 95-98; Khabashesku et al., *Acc. Chem. Res.,* 2002, 35, 1087-1095; and Bahr et al., *J. Mater. Chem.,* 2002, 12, 1952-1958). In these latter embodiments, the amount of functionalized CNTs can range from about 0.0001 weight percent to about 90 weight percent of the weight of the resulting nanocomposite.

In the above-described embodiments, the polymer can be any polymer(s) that suitably interacts with a surfactant that, in turn, interacts with the CNTs. In some such embodiments, the polymer is selected from the group consisting of poly(ε-caprolactone); poly(γ-caprolactone); nylon 6; nylon 66; nylon 6-10; nylon 11; nylon 12; poly(lactic acid); poly(glycolic acid); copolymers of lactic and glycolic acid, and other polyamides and polyesters; polyethelether ketone (PEEK); polyetherimide (PEI); polyimides; polyamidimide; polyphenylene sulfide (PPS); polysulfone; polyvinylidene fluoride (PVDF); and combinations thereof. Generally, the polymer is present in the polymer nanocomposite in an amount ranging from about 10 wt % to about 99.9999 wt %.

Generally, the surfactant can be any surfactant that suitable interacts with both the CNTs and the polymer matrix in the above-described polymer nanocomposites. In some of the above-described embodiments, the surfactant is selected from the group consisting of cationic surfactants, anionic surfactants, zwitterionic surfactants, non-ionic surfactants, and combinations thereof. Generally, the surfactant is present in the polymer nanocomposite in an amount ranging from about $10^{-6}$ wt % to about 15 wt %. In some such embodiments, the surfactant interacts with the polymer with interactions selected from the group consisting of ionic interactions, hydrogen bonding interactions, covalent interactions, physiochemical interactions, Lewis acid/Lewis base interactions, and combinations thereof. In some such embodiments, the surfactant interacts with the CNTs with interactions selected from the group consisting of ionic interactions, hydrogen bonding interactions, covalent interactions, physiochemical interactions, and combinations thereof. In some embodiments, the surfactant interacts with the CNTs with Lewis-acid/Lewis-base interactions.

In some embodiments, the above-described polymer nanocomposite comprises an electrical percolation ranging from 0.0005 to 40.0 wt % CNT. In some embodiments, the nanocomposite is a randomly oriented polymer-carbon nanotube material with geometric percolation ranging from 0.0005 to 40.0 wt % CNT. In some embodiments, the nanocomposite comprises strong nucleating tendencies leading to a 2 to $10^5$ fold increase in rate of crystallization of polymer.

In some embodiments, the present invention is directed to methods for making the above-described polymer nanocomposites, the methods generally comprising the steps of: (a) mixing CNTs and a compatibilizing surfactant with polymer; and (b) simultaneously interacting the surfactant with the CNTs and the polymer to form a polymer nanocomposite.

In some of the above-described methods, the CNTs are selected from the group consisting of purified CNTs, unpurified CNTs, and combinations thereof. In some such embodiments, the CNTs are functionalized in a manner selected from the group consisting of sidewall functionalization, end functionalization, and combinations thereof. In some such embodiments, such functionalization is present only during processing and can be removed using thermal and/or chemical means.

In some of the above-described embodiments, the mixing is carried out in a solvent. In some such embodiments, the solvent is removed after mixing via vacuum drying. In some embodiments, the resulting polymer nanocomposite is isolated by precipitation in a non-solvent followed by drying. In some embodiments, the mixing is carried out in an apparatus selected from the group consisting of a blending apparatus; single-screw extruders, twin screw extruders and injection molders. In some embodiments, the mixing is used to prepare a masterbatch followed by drawdown to necessary composition. In some embodiments, the mixing is carried out at a temperature of from about −100° C. to about 400° C.

For the above-described methods, suitable polymers include any polymer(s) that suitably interacts with a surfactant that, in turn, interacts with the CNTs, and which is suitably processable. Such polymers include, but are not limited to, poly(ε-caprolactone); poly(γ-caprolactone); nylon 6; nylon 66; nylon 6-10; nylon 11; nylon 12; poly(lactic acid); poly(glycolic acid); copolymers of lactic and glycolic acid, and other polyamides and polyesters; polyethelether ketone (PEEK); polyetherimide (PEI); polyimides; polyamidimide; polyphenylene sulfide (PPS); polysulfone; polyvinylidene fluoride (PVDF); and combinations thereof. In the above-described methods, suitable surfactants include, but are not limited to, cationic surfactants, anionic surfactants, zwitterionic surfactants, non-ionic surfactants, and combinations thereof.

In some embodiments, the surfactant interacts with the polymer involving interactions selected from the group consisting of ionic interactions, hydrogen bonding interactions, covalent interactions, physiochemical interactions, and combinations thereof. In some embodiments, the surfactant interacts with the CNTs with interactions selected from the group consisting of ionic interactions, hydrogen bonding interactions, covalent interactions, physiochemical interactions, and combinations thereof. In some embodiments, the surfactant interacts with the CNTs with Lewis-acid/Lewis-base interactions.

In some embodiments, the present invention is directed toward the use of such above-described polymer nanocomposites. These polymer nanocomposites can be used in a variety of applications, including, but not limited to, drug delivery, scaffolding to promote cellular tissue growth and repair, fiber applications, bulk applications, ablation resistant applications, automobile applications, high temperature/high pressure applications, and combinations thereof.

Turning now to an exemplary study, Applicants have developed a method to prepare highly-dispersed nanotube-based polymer nanocomposites (polymer nanocomposites) that exploit the ability of a functional surfactant, capable of having attractive interactions with both the nanotube and the polymer through ionic, electrostatic, hydrogen bonding, covalent, physiochemical, or Lewis acid/Lewis base interactions, to compatibilize the otherwise incompatible CNTs with the host polymer matrix. Applicants have demonstrated the development of well-dispersed CNT nanocomposites with poly(ε-caprolactone) (PCL) using a zwitterionic surfactant (12-aminododecanoic acid, (ADA)) as a compatibilizer. PCL is An exemplary, low melting analog of nylon-6 and a surrogate for the entire nylon series of polymers, polyesters and high performance functional polymers such as PEEK, PSS, etc. PCL is an important commercial material, and additionally is a biocompatible and biodegradable crystalline polymer. Compatibility between PCL and CNT is anticipated based on the fact that the monomer, ε-caprolactone, disperses CNTs effectively. Thus, establishing strong intermolecular interactions between the zwitterionic surfactant and the CNT, and between the surfactant and the polymer, would lead to significantly improved and efficient dispersions. Exemplary compositions are described in Table 1 (FIG. 1). Previous in situ polymerizations of ε-caprolactone end tethered to CNTs via acid terminus surfactant moieties yielded good dispersions with a geometric percolation of between 0.2 and 0.35 wt % CNT. However, by functionalization of the CNTs, the exceptional mechanical and electrical properties, resulting from the perfect structure of the CNTs, could be compromised in the resulting polymer nanocomposites.

Dispersion and the presence of individualized CNTs (HiPco, purified, Carbon Nanotechnologies, Inc.) in the solutions/dispersions of the PCL (Aldrich, weight average molecular weight $M_w$=65K and polydispersity $M_w/M_n$=2), CNT, and ADA in toluene, and in the dried and melt annealed films of the nanocomposites are established by the characteristic van Hove singularities observed between 400-1500 nm in the ultraviolet-visible-near infrared (UV-vis-near IR) spectra. From these spectra, Applicants conclude that the nanotubes are well dispersed as individual tubes or small bundles in both the toluene solution and in the polymer nanocomposites. Applicants have also examined the melt state rheology of the nanocomposites to understand the flow properties of such hybrid materials and to better quantify the mesoscale dispersion of the nanotubes. The addition of nanoparticles results in changes in the viscoelasticity of the polymer—the presence of a geometrically percolated filler network structure leading to hydrodynamic consequences of solid-like behavior with the presence of a finite yield stress and a long time divergence in the complex viscosity in small amplitude (linear) oscillatory shear. The nanocomposites with loadings as low as 0.1 wt % CNT demonstrate solid-like characteristics at low oscillatory frequencies with the presence of a plateau (i.e., frequency independent) in the storage modulus, and a divergence of the complex viscosity is shown and is consistent with the presence of a percolated nanoparticle network structure. From calculations of percolation of ellipsoids, Applicants conclude that the effective anisotropy of the CNTs in the PCL nanocomposites is ~750 (Zhang et al., *Nano Letters* 2003, 3, 1285-1288).

Other ways of characterizing the dispersion and morphology of the PCL/ADD/CNT series are by using scanning electron microscopy (SEM) and atomic force microscopy (AFM). The morphology of the nanocomposites was probed using AFM in tapping mode, and the dimensions of the spherulites were found to decrease upon addition of the CNTs—consistent with heterogenous nucleation (Basiuk et al., *J. Phys. Chem. B* 2002, 106, 1588-1597; Kong et al., *J. Phys. Chem. B* 2001, 105, 2890-2893; Chattopadhyay et al., *J. Am. Chem. Soc.* 2003, 125). FIGS. 2A and 2B show the AFM images obtained for PCL (2A) and PCL04A (2B). On a global scale, no changes in morphology were seen. However, on a local scale, striations believed to be associated with the presence of individual CNTs or small bundles of the CNTs are visible in FIG. 2B.

The following Examples are included to demonstrate particular embodiments of the present invention, particularly where such Examples build on the above-described exemplary study. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

This Example serves to illustrate how a polymer nanocomposite can be made, in accordance with some embodiments of the present invention.

The CNTs used in this study were primarily SWNTs produced by the HiPco® process (Nikolaev et al., *Chemical Physics Letters* 1999, 313, 91-97) and purified according to literature methods (Chiang et al., *J. Phys. Chem. B* 2001, 105, 8297-8301). The nanotubes were dispersed in toluene using 12-aminododecanoic acid, a zwitterionic surfactant, assisted by mild sonication. The polymer (PCL) was added to this suspension after sonication. Applicants note that the nanotube dispersion, without centrifugation to remove bundles or aggregates, appear to be significantly stabilized by the addition of the polymer. To form nanocomposite articles (e.g., films), the solvent was removed by extensive drying under ambient conditions followed by vacuum drying at room temperature with subsequent vacuum drying in the melt state (100° C.) for at least 24 hours.

EXAMPLE 2

This Example serves to illustrate how the polymer nanocomposites can be evaluated, particularly for CNT dispersion, both in the final product and during processing, in accordance with some embodiments of the present invention.

UV-Vis-Near IR Spectroscopy

UV-vis-near IR measurements were performed using a Jasco V570 spectrophotometer over a wavelength range of 300 to 2500 nm. Solution spectra were obtained using a 1 mm pathlength quartz cuvette, and the nanocomposite films were melt pressed to a thickness of 140 μm and the corresponding spectra were obtained on free-standing films. For scanning electron microscopy (SEM), bulk samples were sputtered with gold to prevent charging, and the surface morphology of the CNT-based PCL nanocomposites were probed using a Philips scanning electron microscope at an accelerating voltage of 30 kV.

Melt Rheology

Samples for melt rheology were prepared by vacuum molding ~1 g of polymer nanocomposite sample in a 25 mm die and pressing in a Carver press at 80° C. for 1 hour using a maximum 1-ton load. Melt-state rheological measurements were performed on a TA Instruments ARES rheometer with a torque transducer range of 0.2 to 2000 $g_f$ cm using 25 mm diameter parallel plates with a sample thickness of 1-2 mm and a temperature range of 65 to 90° C. An oscillatory strain ($\gamma(t)$) of the form $$\gamma(t) = \gamma_0 \sin(\omega t) \qquad \text{Eq. (1)}$$

was applied where $\gamma_0$ is the strain amplitude (always less than 0.15 in the studies reported here, and typically below 0.02) and ω was the frequency. The resulting time dependent linear shear stress (σ(t)) is interpreted as $$\sigma(t) = \gamma_0(G' \sin(\omega t) + G'' \cos(\omega t)) \qquad \text{Eq. (2)}$$

where G' and G'' are the storage and loss modulus respectively. All measurements in this study were verified to be linear (i.e., G' and G'' independent of $\gamma_0$) and interpreted using equation 2 (Eq. 2). Additional rheological parameters used in this study include the complex modulus ($G^* = \sqrt{(G')^2 + (G'')^2}$) and the complex viscosity ($\eta^* = G^*/\omega$).

Electrical Conductivity

Electrical conductivity characterization of the nanocomposites was performed using measurements of dc resistance utilizing a two-point probe at room temperature. The dc conductivity ($\sigma_{dc}$) was obtained from:

$$\sigma_{dc} = \frac{1}{R * t} \qquad \text{Eq. (3)}$$

where R is the dc resistance and t is the thickness of the sample. Samples were typically 0.5 to 1 mm thick, as prepared by vacuum molding.

Small Angle X-Ray Scattering

Small angle X-ray scattering (SAXS) measurements were performed at the National Synchrotron Light Source (NSLS) at Brookhaven National Laboratory Beamline X27C with a wavelength (λ) of 1.371 Å, and with a beam diameter of ~0.5 mm at the sample. Samples were prepared as discs of 7 mm diameter and 1.5 mm thick and placed in brass annular holder with kapton tape windows and heated in a dual chamber oven with the measurements reported in the paper being performed in the melt state of the polymer at 80° C. The collected data were corrected for background scattering and empty cell scattering using standard methods (Chattopudhyay et al., *J. Am. Chem. Soc.* 2002, 124, 728-729). X-ray diffraction over a 2θ range of 10 to 35° were performed simultaneously with the SAXS measurements and the data reported here are on samples prepared by isothermal crystallization at 43° C.

Fourier Transform Infrared Spectroscopy

FTIR spectra were recorded on a ThermoNicolet 4700 FTIR. 72 scans per sample were collected with a resolution of 4 $cm^{-1}$. Samples for FTIR were prepared by solution casting dilute solutions onto NaCl windows and evaporating the solvent in a vacuum oven at 50° C. before measurement.

Differential Scanning Calorimetry

Bulk differential scanning calorimetry (DSC) measurements were performed on a Perkin-Elmer Pyris 1 DSC instrument with sub-ambient capability. Samples were scanned from a temperature of −110° C. to +90° C. at heating and cooling rates of 10° C./minute. Non-isothermal crystallization and melting following the crystallization were studied, with the melting transition captured by reporting the onset and final melting temperatures and the latent heat of melting.

EXAMPLE 3

This Example serves to illustrate, in greater detail, how UV-vis-near IR spectroscopy can be used to characterize the dispersion of CNTs, in accordance with some embodiments of the present invention.

Figure 3:
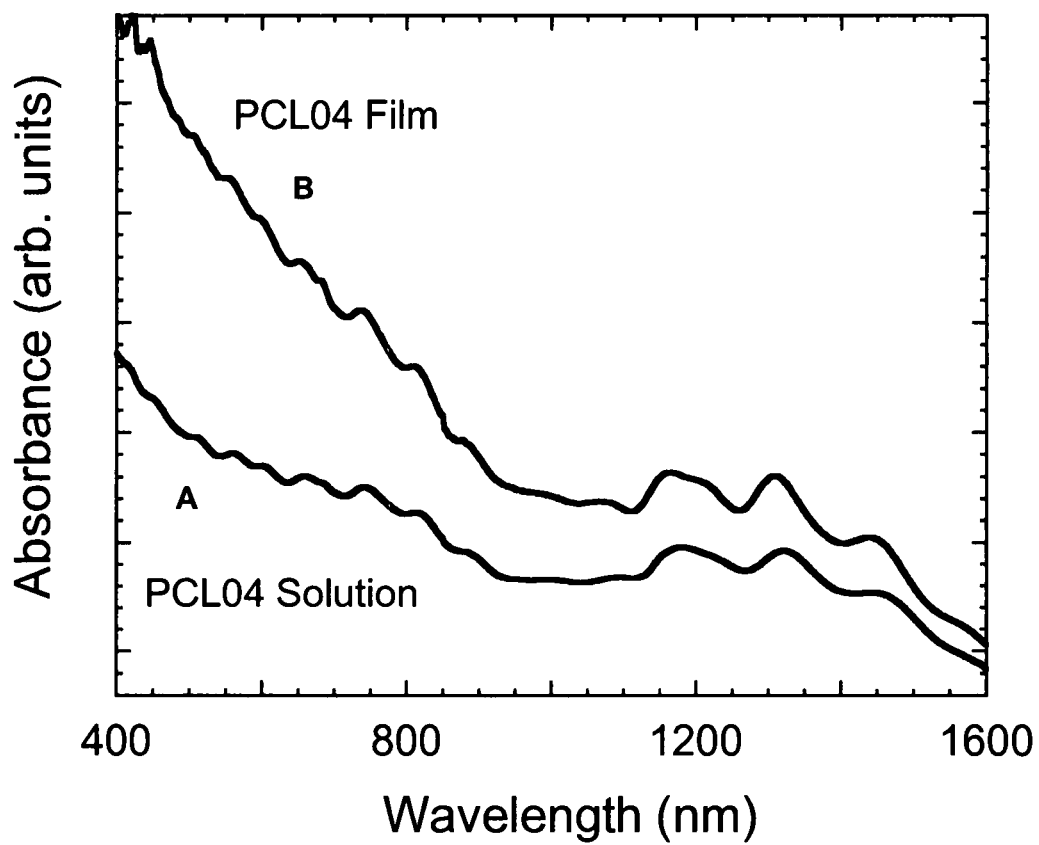
FIG. 3 depicts absorption spectra for a PCL nanocomposite comprising 0.4 wt % CNT dispersed with ADD in toluene and the corresponding thin film nanocomposite, wherein dispersion and the presence of individualized or small bundles of tubes are established by the characteristic van Hove singularities observed between 400 and 1500 nm.

The UV-vis-near IR absorption spectra from a solution of CNTs dispersed in toluene with the aid of 12-aminododecanoic acid (ADA) and to which the polymer (PCL) was added (0.4 wt % CNT relative to the pure polymer), and spectra from a dried film of the same nanocomposite are shown in FIG. 3, wherein Trace A is the liquid dispersion and wherein Trace B is the dispersion in the resulting nanocomposite. UV-visible-near IR spectroscopy provides a good indication of the dispersion quality of CNTs in solvents (Chen et al., *Science* 1998, 282, 95-98), surfactant assisted solutions of CNTs (Walters et al., *Appl. Phys. Lett.,* 1999, 74, 3803-3805), and CNT-based polymer composites (Zhang et al., *Nano Letters* 2003, 3, 1285-1288). Smaller bundles and individually dispersed nanotubes exhibit pronounced van Hove singularities while larger bundles of CNTs and their aggregates exhibit broadened or sharp features, or display none at all. The characteristic peaks associated with the van Hove singularities are clearly visible in the spectra of the solution shown in FIG. 3. Similar spectra were observed for other concentrations and are not shown here. For the nanocomposite film, no significant broadening of the van Hove singularities is observed and, in fact, the peaks seem somewhat sharper. Also, the peaks in the absorption spectra for the nanocomposite are at the same positions as in the toluene solution.

While not intending to be bound by theory, Applicants suggest that zwitterionic surfactants help disperse CNTs as individuals or as small bundles via favorable interactions between the amine headgroup and the nanotubes and via physisorption. It has been shown previously through small angle neutron scattering that a very small fraction of the surfactant chains participate in the solubilization of the CNTs, even in water (Yurekli et al., *J. Am. Chem. Soc.,* 2004, 126, 9902-9903; Matarredona et al., *J. Phys, Chem. B* 2003, 107, 13357-13367; and Nikolaev et al., *Chem. Phys. Lett.* 1999, 313, 91-97). Further, upon addition of PCL, the dispersion is maintained by the development of favorable interactions between the surfactant and the PCL by hydrogen bonding, resulting in compatibilization between the nanotubes and the polymer. This, in conjunction with the observed compatibility between ε-caprolactone and CNTs (Ausman et al., *J. Phys. Chem. B* 2000, 104, 8911-8915), results in well dispersed nanotube dispersions in PCL.

EXAMPLE 4

This Example serves to better illustrate CNT dispersion, and how techniques such as SEM and SAXS can be used to evaluate said dispersion, in accordance with some embodiments of the present invention.

As-produced (unpurified) CNTs, and particularly SWNTs, are typically held together in ropes or bundles of ropes by van der Waals forces and by π-π (pi-pi) stacking forces, and are difficult to disperse as individual nanotubes or even as small bundles (Thess et al., *Science* 1996, 273, 483-487. Surfactants have been utilized successfully to aid in the dispersion of individual CNTs or smaller bundles of CNTs in aqueous solution (Walters et al., *Appl. Phys. Lett.,* 1999, 74, 3803-3805). Amine based surfactants have been shown to favorably interact with CNTs (Basiuk et al., *J. Phys. Chem. B* 2002, 106, 1588-1597; Kong et al., *J. Phys. Chem. B* 2001, 105, 2890-2893), and stable dispersions of CNTs with octyldecylamine (ODA) in tetrahydrofuran (THF) have been observed (Chattopadhyay et al., *J. Am. Chem. Soc.* 2003, 125; Chattopadhyay et al., *J. Am. Chem. Soc.* 2002, 124, 728-729). While not intending to be bound by theory, two mechanisms for the amine surfactant assisted dispersion of the nanotubes have been proposed. One, by which a zwitterion is formed with the carboxyl functionalities observed on SWNT ends or from sidewall defects (Chattopadhyay et al., *J. Am. Chem. Soc.* 2002, 124, 728-729; Hamon et al., *Adv. Mater.* 1999, 11, 834-840; Kahn et al., *Nano Letters* 2002, 2, 1215-1218) which arguably may not be enough of a mechanism to prevent CNT aggregation. The second mechanism for dispersion is the physisorption of the amine cation based surfactants along the sidewalls of the nanotubes. Both mechanisms could conceivably be occurring simultaneously. In both cases, and noting a recent study by Matarredona et al. (Matarredona et al., *Journal of Physical Chemistry B* 2003, 107, 13357-13367) where they observed that the minimum amount of surfactant needed to disperse the CNTs was well below the critical micelle concentration (cmc) of the surfactant, it is reasonable to assume that a small amount of surfactant can result in an effective dispersion.

Figure 4:
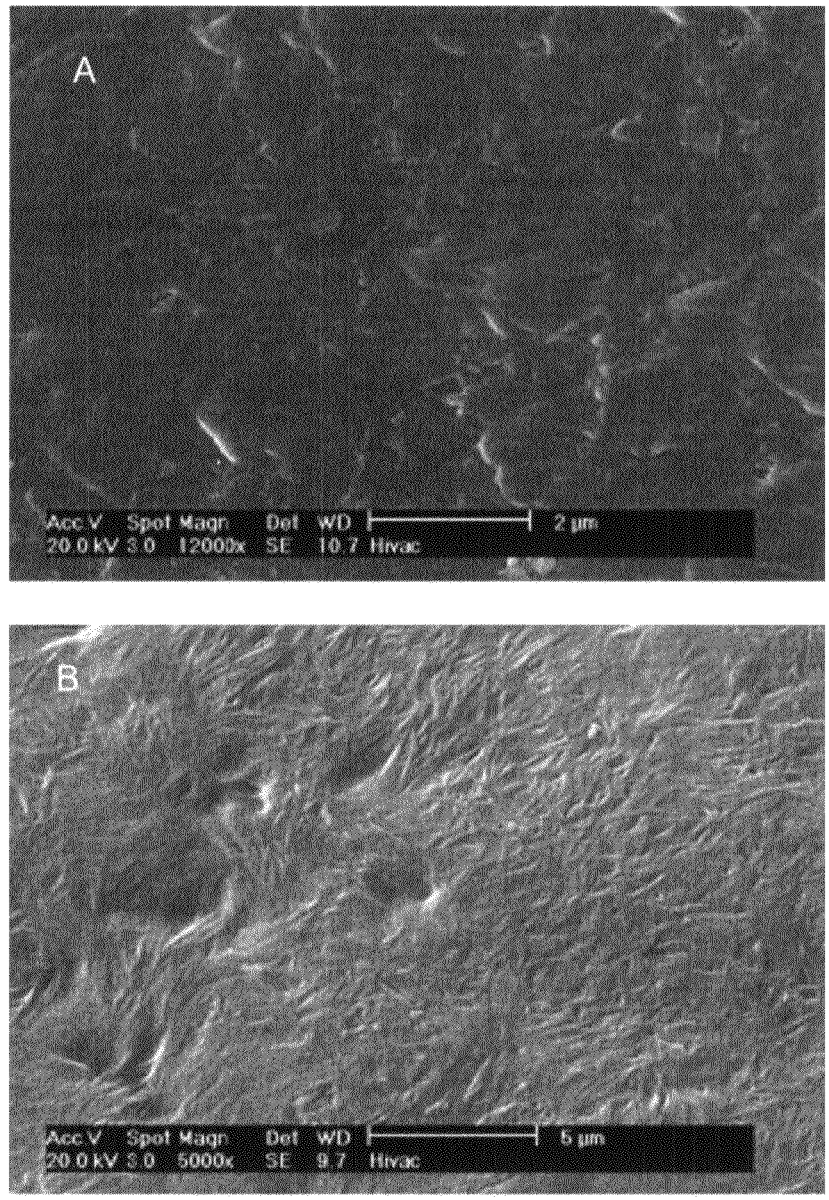
FIGS. 4A and 4B are SEM micrographs of PCL02 (4A) and PCL08 (4B), wherein the surfaces are relatively homogeneous with no appearance of large bundles or aggregates of CNTs.

The state of dispersion is further corroborated by SEM (FIGS. 4A and 4B). SEM images exhibit no large-scale aggregates and further provide evidence that the nanocomposites are highly dispersed.

Figure 5:
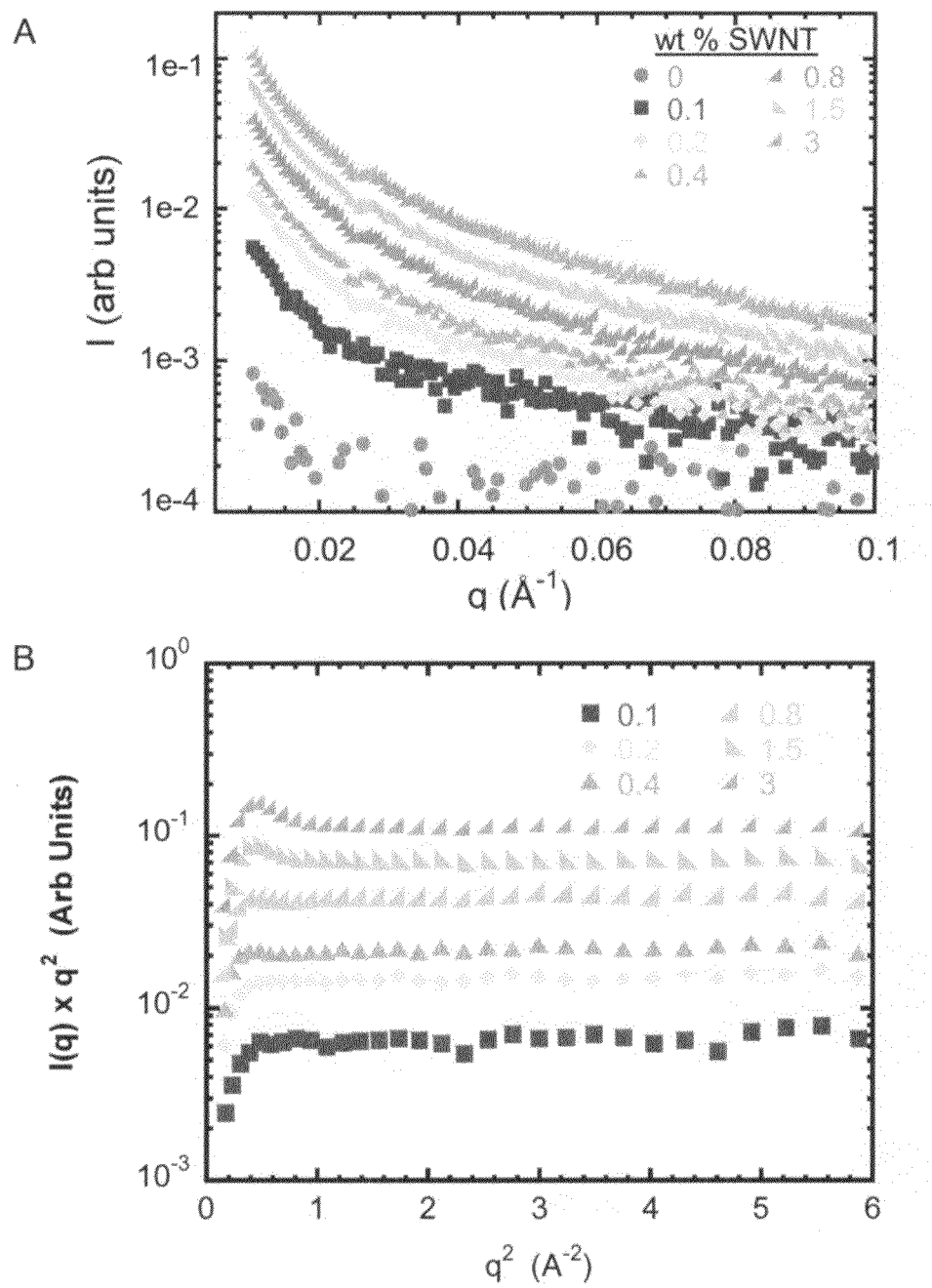
FIGS. 5A and 5B depict small angle X-ray scattering (SAXS) data in the melt state for the series of PCL nanocomposites, wherein the dependence of the scattering intensity plotted against q (5A) is featureless and monotonically decreases with increasing q, and wherein the q dependence is much better observed in a Kratky-Porod plot of the product of $Iq^2$ vs $q^2$ (5B)
Figure 6:
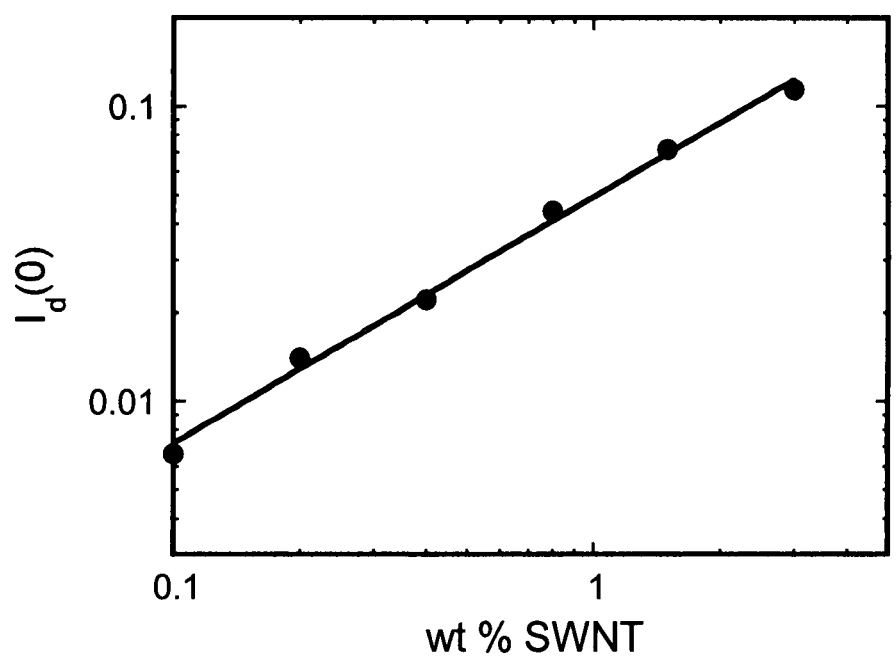
FIG. 6 depicts the q=0 value of I obtained from the Kratky-Porod analysis of the data shown in FIG. 5.

FIGS. 5A and 5B show small angle x-ray scattering (SAXS) data in the melt state of the polymer (T=70° C.) for the series of exemplary nanocomposites described herein. The data in FIG. 5A demonstrate that the q-dependence of the scattered intensity is featureless and monotonically decreases with an increase in q. The q-dependence of the scattered intensity particularly that at low-q, is better observed in FIG. 5B where the product of $Iq^2$ is plotted against q. From this data, it is clear that for q values from 0.01 to 0.02 Å$^{-1}$, the SAXS intensity scales as $q^{-2}$. The persistence of the q-scaling from 0.1 wt % up to 3 wt % and with no cross-over to a stronger q-dependence at high concentrations of nanotubes as would be expected from larger ropes or aggregates along with the previously demonstrated UV-Vis-Near IR data to demonstrate the presence of individualized nanotubes, would appear to suggest that the observed q-scaling is not from the aggregate structure of the nanotubes. Additionally, the intensity at any q-value, and equivalently the average value of the product $Iq^2$ at low q-values, scales approximately linearly with SWNT concentration as shown in FIG. 6.

EXAMPLE 5

This Example serves to illustrate how melt state rheology can be used to probe the dispersion of CNTs in a polymer nanocomposite of the present invention.

Previously, melt state rheology has been demonstrated to be a powerful probe of the mesoscale dispersion of nanoparticles including highly anisotropic layered silicates and functionalized CNTs (Mitchell et al., *Journal of Polymer Science Part B: Polymer Physics* 2002, 40, 1434-1443; Liu et al., *Polymer* 2003, 44, 7529-7532; Potschke et al., *Polymer* 2002, 43, 3247-3255). In the present study, rheology data was collected over a narrow range of temperatures (70 to 90° C.). Only the smallest possible oscillatory strain amplitudes were employed, so as to obtain a linear stress response and apply a minimal deformation on the microstructure so as to not alter the quiescent state structure of the nanocomposite. The melt rheological data were superposed using the Boltzmann principle of time-temperature superpositioning to obtain mastercurves. Horizontal or frequency shift factors ($a_T$) were applied and no vertical or modulus shifts were necessary. The shift factors for the nanocomposite are similar to that of the unfilled polymer and obey an Arrhenius-type temperature dependence with an activation energy of ~19 kJ/mol.

Figure 7:
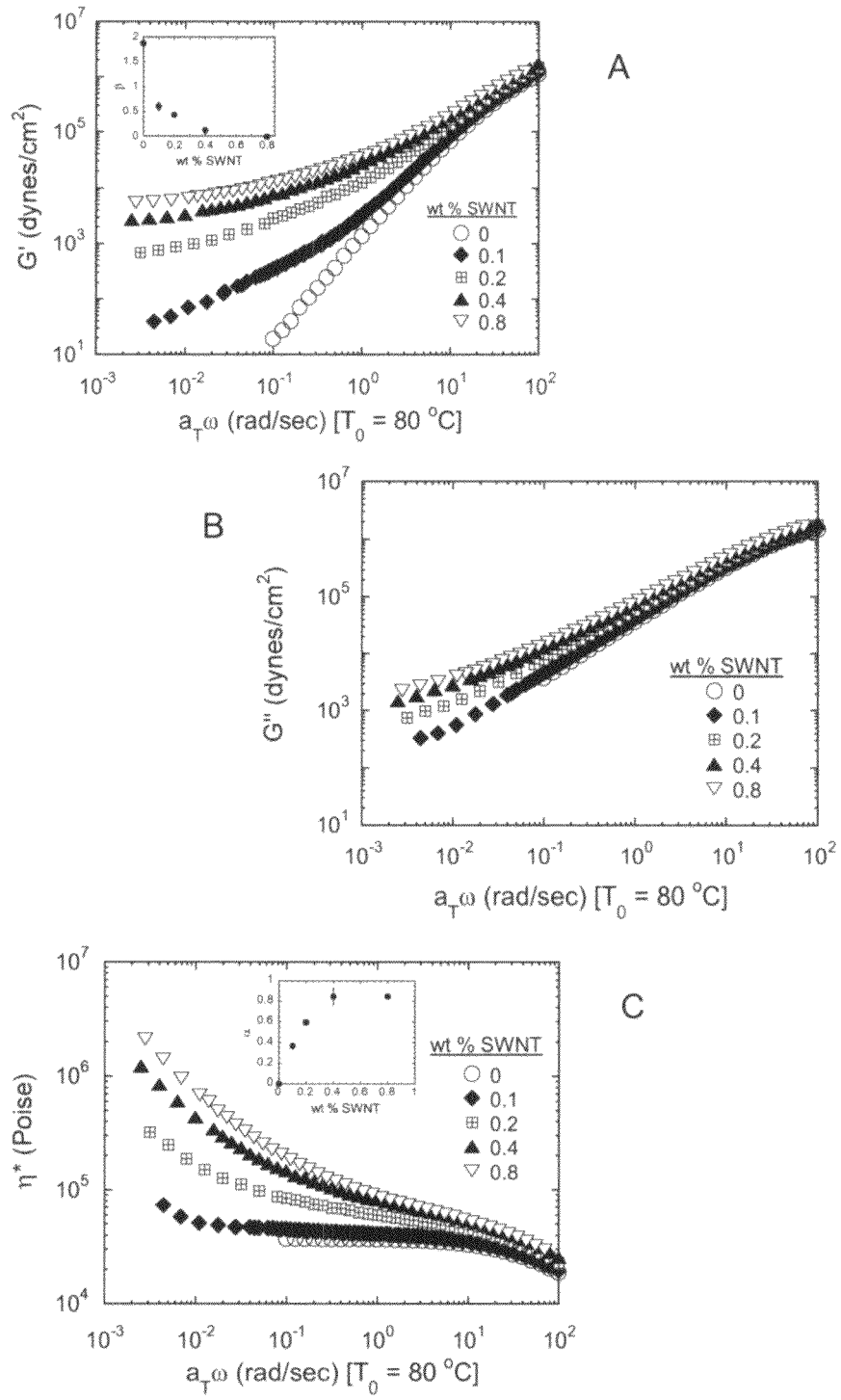
FIGS. 7A-7C are mastercurves for the frequency dependence of the storage modulus G' (7A), loss modulus G" (7B) and complex viscosity $\eta^*$ (7C) for the pure polymer and the nanocomposites, wherein the nanocomposites with a loading as low as 0.1 wt % CNT demonstrate solid-like characteristics at low frequencies with the presence of a plateau or frequency independence in the storage modulus, G', wherein the loss modulus also exhibits decreasing frequency dependence, and wherein the insets of 7A and 7C demonstrate a step change in the low frequency power law exponents of G' and η* (β and α respectively) at just 0.1 wt %, indicating a transition from liquid-like to solid-like behavior.

The viscoelastic functions G' (storage modulus), G" (loss modulus), and complex viscosity ($\eta^*$) for the pure polymer and the nanocomposites with differing levels of added CNTs are shown in FIGS. 7A-7C. The pure polymer behaves as a Newtonian liquid at low frequencies with $G' \propto \omega^2$, $G'' \propto \omega^1$, and $\eta^* \propto \omega^0$. The nanocomposites, on the other hand, display an increase in the value of G', a decrease in the frequency dependence of G' (i.e., $G' \propto \omega^\beta$, with $\beta<2$), an increase in the value of $\eta^*$ and an increased frequency dependence (i.e., low frequency divergence) of $\eta^*$ (i.e., $\eta^* \propto \omega^{-\alpha}$, with $0<\alpha<1$) at low frequencies. In the insets of FIGS. 7A and 7C, the exponents $\beta$ and $\alpha$, respectively, (obtained by fitting of last 5 frequency data points) are plotted as a function of nanotube concentration. The values of $\alpha$ increase monotonically from 0 to 0.8 and the value of $\beta$ decreases monotonically from 2 to 0.2 with increasing nanotube concentration.

Overall, the rheological behavior of the nanocomposites is similar to that of soft glassy materials, and indicates the formation of a solid-like material for loadings as low as 0.1 wt % nanotubes. A step change in the behavior of both G' and $\eta^*$ and their corresponding frequency exponents $\beta$ and $\alpha$, respectively, is observed at 0.1 wt % and indicative of a transition from liquid to solid. This transition is associated with the formation of a geometrically percolated network structure and has been demonstrated for macrocomposites of carbon black-filled elastomers (Yurekli et al., *Journal of Polymer Science Part B: Polymer Physics* 2001, 39, 256-275), highly anisotropic layered silicates in various matrices (Krishnamoorti et al., *Curr. Opin. Colloid Interface Sci.* 2001, 6, 464-470; Ren et al., *Macromolecules* 2000, 33, 3739-3746), multiwall carbon nanotube composites (Liu et al., *Polymer* 2003, 44, 7529-7532; Potschke et al., *Polymer* 2002, 43, 3247-3255), and for functionalized CNTs in polystyrene (Mitchell et al., *Macromolecules* 2002, 35, 8825-8850). An exceptional result of this study is the finding that an extremely low concentration of nanotubes is all that is necessary to establish this mesoscale network of overlapping hydrodynamic volumes of the filler inclusions in the polymer matrix.

Figure 8:
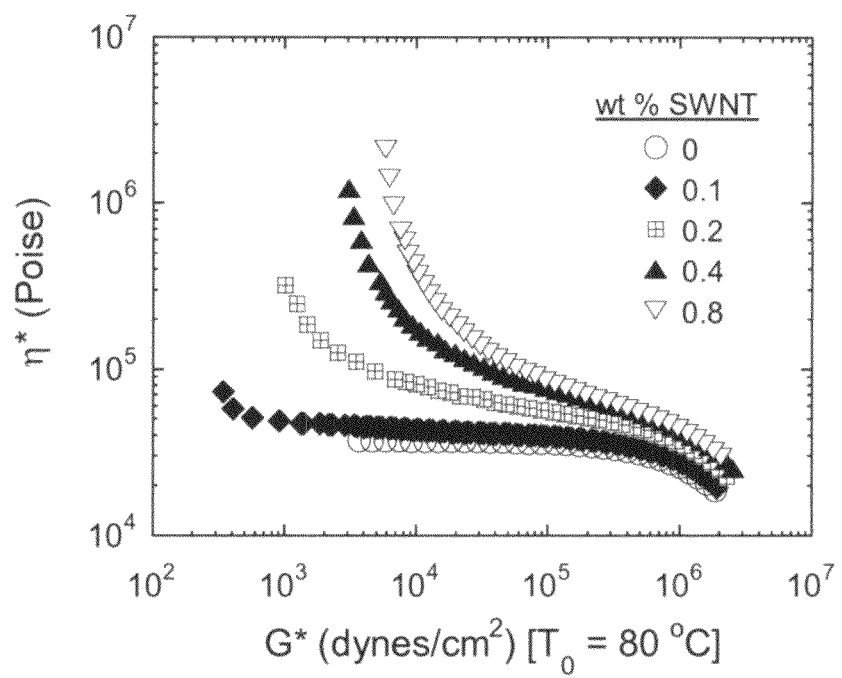
FIG. 8 depicts the viscosity cross-plotted against the complex modulus and demonstrates a diverging η* at a finite G* value for all the nanocomposites indicating materials with yield stresses, wherein this provides further evidence for the development of a percolated network structure of the nanotubes at concentrations as low as 0.1 wt % CNTs in PCL.

Associated with the formation of a percolated network structure is the development of a finite yield stress (Enikolopyan et al., *Advances in Polymer Science* 1990, 96, 1-67) which is manifested as a diverging $\eta^*$ vs G* plot, as shown in FIG. 8. This divergence has been correlated with steady shear measurements at low shear rates and creep measurements in previously studied layered silicate nanocomposites to a measured finite yield stress and confirms, in this case, the development of solid-like behavior at a nanotube loading as low as 0.1 wt %.

The geometric percolation threshold is dependent upon the largest dimension (l) and the effective anisotropy (l/d) of the nanoparticle or aggregate of nanoparticles. For isotropic spheres, in three dimensions with no excluded volume interactions, the percolation threshold is 30 vol % (Isichenko, *Rev. Mod. Phys* 1992, 64, 961), and for prolate and oblate ellipsoids it is considerably lower and dependent on the effective aspect ratio (l/d). Based on calculations for the percolation of ellipsoids (Isichenko, *Rev. Mod. Phys* 1992, 64, 961), for a system where percolation of the primary objects occurs $\sim 5 \times 10^{-4}$ vol % (=0.1 wt % CNT) the expected anisotropy, or l/d is ~1000 or more.

Figure 9:
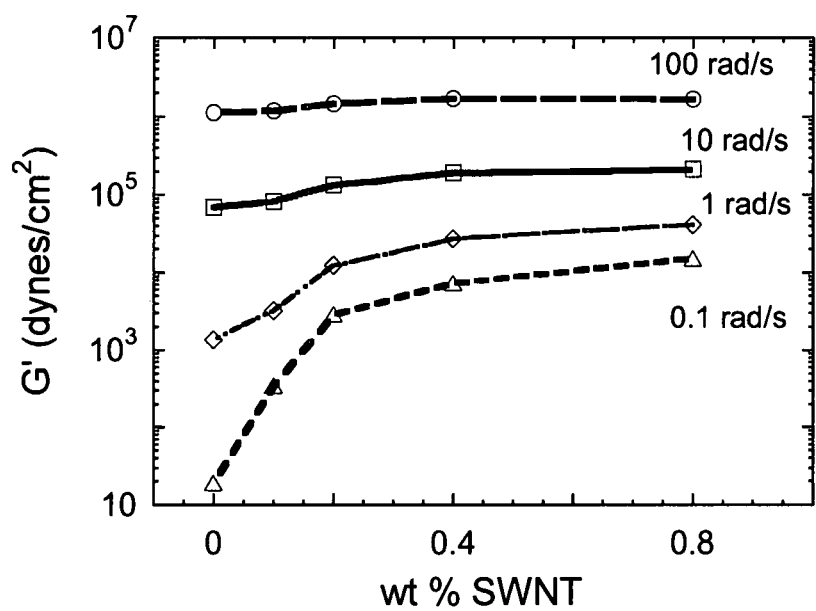
FIG. 9 depicts the storage modulus G' at various frequencies as a function of wt % CNT, and while G' does increase at all frequencies with increasing concentration of nanotubes, the effect is demonstrated to a greater extent at low frequencies and is due to the increasing yield stress of the nanocomposites with increasing concentration of the CNTs.

While G' and $\eta^*$ do increase at all frequencies upon increasing the concentration of the CNTs, the effect is much more pronounced at low reduced frequency. FIG. 9 shows the SWNT concentration dependence of G' for various frequencies. The steep increase of G' with concentration at low frequencies is indicative of the increasing yield stress with increasing nanotube concentration.

EXAMPLE 6

This Example serves to illustrate how dc electrical conductivity measurements can be used to examine geometric percolation in the polymer nanocomposites.

Figure 10:
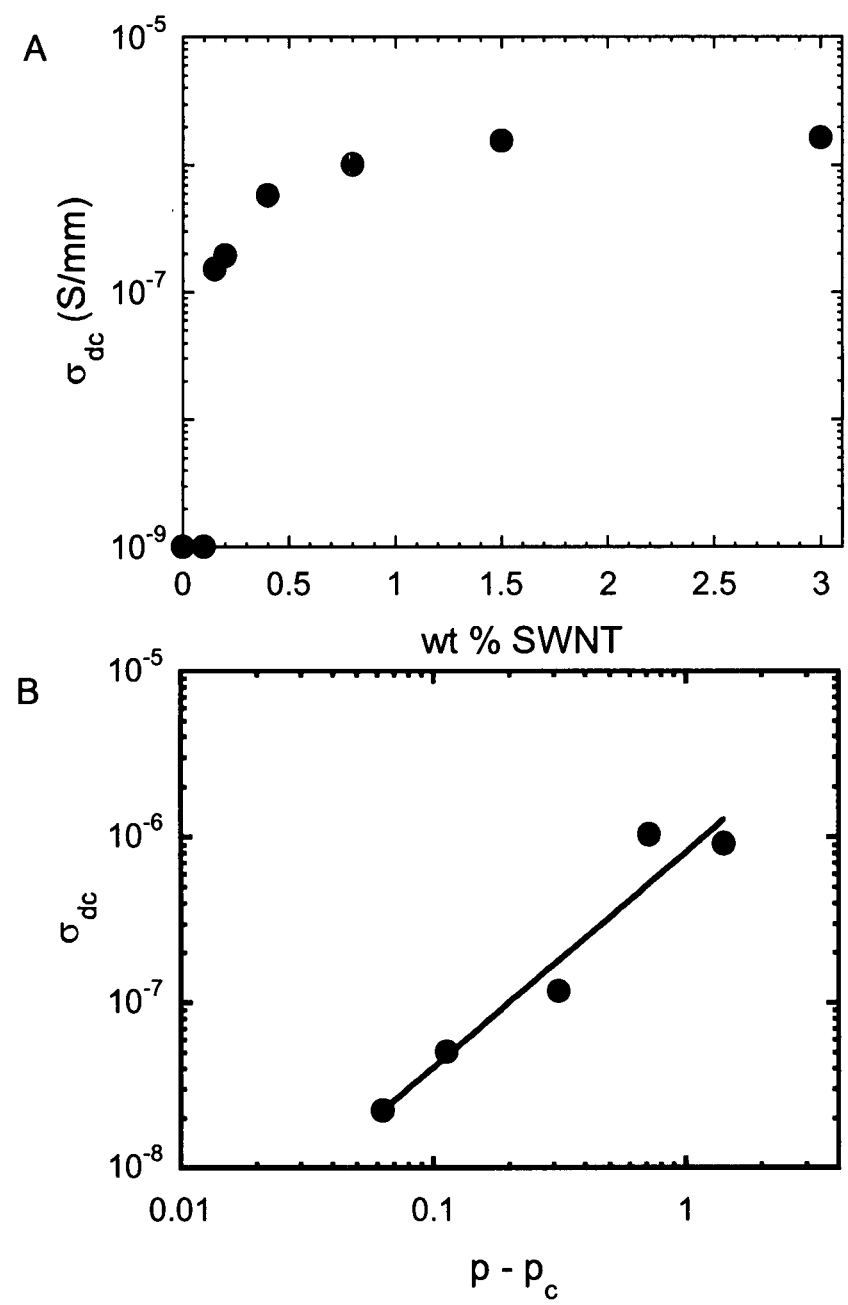
FIGS. 10A and 10B depict the dc conductivity vs wt % CNT (10A); and the percolation threshold ($p_c$) is easily obtained by a best fit to a plot of $\sigma_{dc}$ vs (p-$p_c$) (10B), wherein the best fit yields an electrical percolation threshold of $0.0.08_7 \pm 0.00_6$ wt % with a scaling exponent of $1.3 \pm 0.2$ consistent with the value of the exponent associated with three dimensional systems.

Applicants investigated the solid-state electrical conductivity by dc conductivity measurements as a function of CNT concentration in order to examine if the geometric percolation noted in the melt state has consequences on the solid state electrical properties of the nanocomposites. FIG. 10A shows a plot of the dc conductivity as a function CNT concentration. The volume resistance of the pure polymer and the 0.1 wt % hybrid were beyond the limits of the four-point probe used where the limit gives a dc conductivity of $10^{-9}$ S/mm. Applicants further note that the addition of the zwitterionic surfactant by itself does not alter the conductivity of the PCL where the addition of the surfactant at the loadings comparable to that in the highest concentration nanocomposite leaves the polymer as an insulating material. The 0.1 wt % nanocomposite is the lowest concentration of CNTs at which Applicants are able to measure a conductivity greater than $10^{-9}$ S/mm. The measured conductivity as a function of nanotube concentration to a first approximation follows:

$$\sigma = C(p-p_c)^t \qquad \text{Eq. (4)}$$

where $\sigma$ is the conductivity, p is the concentration of nanotubes, $p_c$ is the concentration of nanotubes at the electrical percolation threshold, t is a universal scaling exponent, and C is a prefactor constant (Youngs, *Journal of Physics D: Applied Physics* 2002, 35, 3127-3137; Youngs, J. In.; University College: London, 2001). The data fit Eq. 4 and the underlying percolation theory well. FIG. 10B is a log-log plot of the dc conductivity as a function of $p-p_c$ where the best fit yields a percolation threshold weight fraction $p_c=0.08_7 \pm 0.00_6$ and a scaling exponent $t=1.3 \pm 0.2$.

Such a low value for the percolation threshold is encouraging, consistent with the geometric percolation obtained by rheology, and is much less than that seen in CNT-based polycarbonate composites where the electrical percolation was reported as being between 1 and 2 wt %, in CNT-based poly(3-octylthiophene) composites (11 wt %) (Kymakis et al., *Synthetic Metals* 2002, 127, 59-62), and in CNTs in epoxy (0.74 wt %) (Kim et al., *Journal of Applied Physics* 2003, 94, 6724-6728). Given the high anisotropy of individual CNTs, it is expected that a very low percolation threshold, similar to the geometric percolation in the present study, could be observed.

EXAMPLE 7

This Example serves to illustrate how CNTs in a polymer nanocomposite might affect the glass transition and crystalline structure of the polymer matrix.

With such favorable dispersion, it is important to address the effect the addition of the nanoparticles has on the polymer properties such as the crystalline structure and the glass transition. Applicants present the glass transition temperature ($T_g$) for the PCL in the nanocomposites as a function of CNT concentration in FIG. 11A. The glass transition temperature of the polymer might be expected to change with increasing CNT due to the high surface area of the dispersed CNTs, even at low volume fractions of CNT, for two reasons. Previous work on free-standing and confined polymer films has demonstrated that the glass transition temperature can be significantly altered. On the basis of dispersion (i.e., the percolation threshold), and assuming an average length of a CNT in the nanocomposites of 1 μm, it is anticipated that, at 0.1 wt %, the nanotubes are, on average, 1 μm apart, and at 3 wt %, 50 nm apart. The data presented in FIG. 11A demonstrates no significant change in the location of the $T_g$ and the breadth of the calorimetrically measured transition. One possibility is that the $T_g$ of the polymer segments near the nanotube surface, that might be significantly affected by the nanotube, is small and/or has a glass transition that is highly broadened or smeared.

Figure 11:
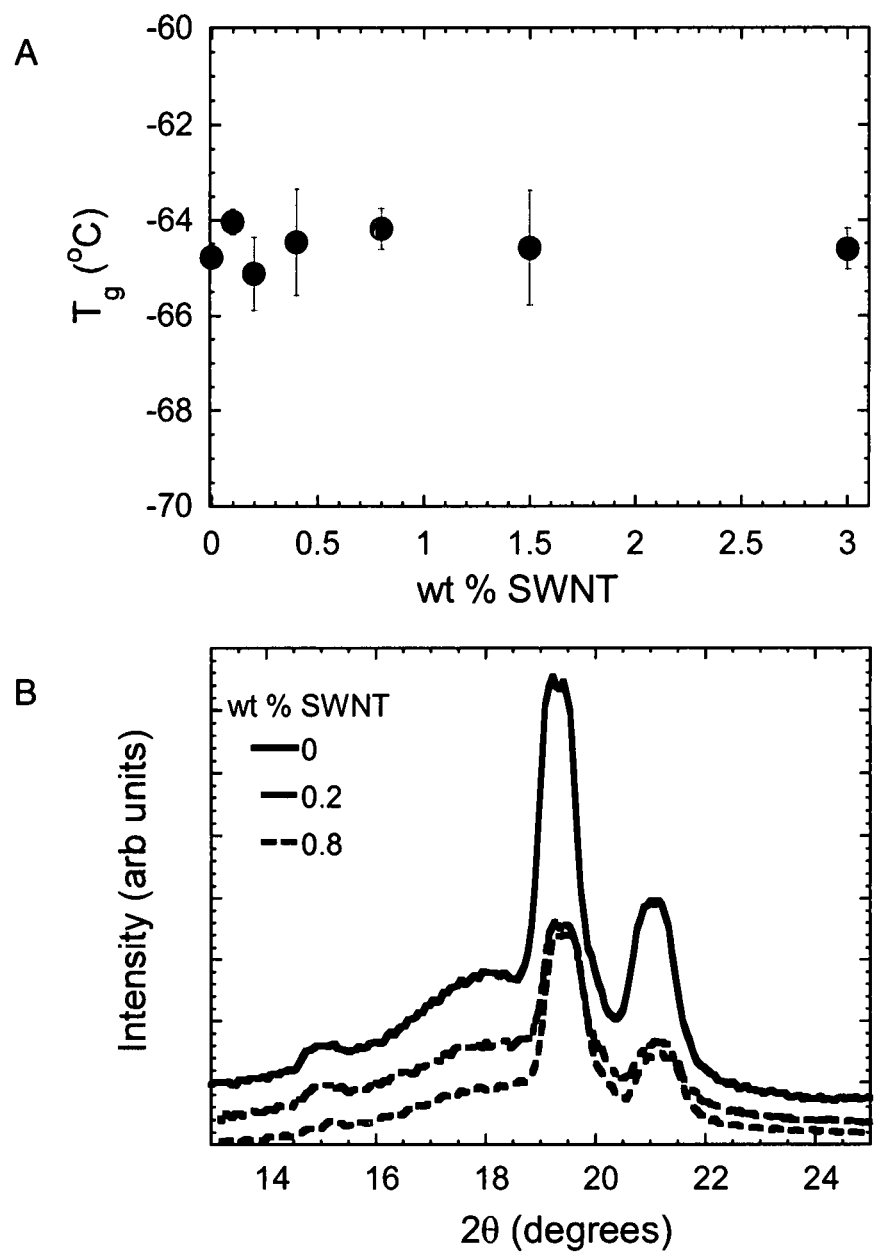
FIGS. 11A and 11B depict, where DSC scans at a heating rate of 10° C./minute were performed to determine the glass transition temperature ($T_g$) of the pure polymer and the nanocomposites, results plotted vs wt % CNT (11A) indicating no change in the glass transition temperature, and WAXS data (11B) for samples crystallized isothermally at 43° C. indicating no change in crystalline structure upon addition of the nanotubes.

FIG. 11B presents the XRD data of the pure polymer and the hybrid at room temperature, following a slow quench from the melt state, and elucidates the crystalline structure of the polymer and the nanocomposites. There is no change in crystalline peak position, nor is there any significant broadening or narrowing of the full width at half maximum (fwhm). Additionally, Applicants observed no systematic change in the final melting temperature of the PCL in the nanocomposites using both DSC and in-situ SAXS and wide-angle X-ray scattering (WAXS) measurements.

The study described above in Examples 1-7 illustrate a mechanism for the favorable dispersion of the CNTs assisted by ADA in PCL. While not intending to be bound by theory, the crux of the mechanism (particularly as it relates to CNT/ADA/PCL nanocomposite systems) is that some of the CNTs are dispersed favorably by physisorption of the amine headgroup onto the surface of the CNTs, and further exfoliation of the CNTs was accomplished by the introduction of favorable intermolecular interactions formed by hydrogen bonding between the PCL and the zwitterionic surfactant. This mechanism is supported by the fact that the carbonyl group of PCL is known to develop strong intermolecular hydrogen bonds (Watanabe et al., *Polymer International* 2001, 50, 463-468) with various compounds such as thiodiphenol, which contains two hydroxyl groups, as well as several low-molecular weight amino compounds. A broadening of the carbonyl band, as seen in the infrared spectrum, on the low wave number side has been observed and attributed to hydrogen bonding.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method of forming a polymer nanocomposite, wherein the method comprises the steps of:
   a) mixing CNTs and a compatibilizing surfactant with a polymer,
   wherein the surfactant is a zwitterionic surfactant that comprises chemical groups capable of establishing simultaneous interactions with both the CNTs and the polymer, and
   wherein the polymer is selected from the group consisting of poly(ε-caprolactone); poly(γ-caprolactone); nylon 6; nylon 66; nylon 6-10; nylon 11; nylon 12; poly(lactic acid); poly(glycolic acid); copolymers of lactic and glycolic acid, and other polyamides and polyesters; polyethelether ketone (PEEK); polyetherimide (PEI); polyimides; polyamidimide; polyphenylene sulfide (PPS); polysulfone; polyvinylidene fluoride (PVDF); and combinations thereof; and
   b) simultaneously interacting the zwitterionic surfactant with the CNTs and the polymer to form the polymer nanocomposite, wherein the zwitterionic surfactant simultaneously interacts with the CNTs and the polymer through interactions selected from the group consisting of ionic interactions, electrostatic interactions, hydrogen bonding interactions, covalent interactions, physiochemical interactions, Lewis-acid/Lewis-base interactions, and combinations thereof.

2. The method of claim 1, wherein at least some of the CNTs are functionalized in a manner selected from the group consisting of sidewall functionalization, end functionalization, and combinations thereof.

3. The method of claim 1, wherein the CNTs are selected from the group consisting of purified CNTs, unpurified CNTs, and combinations thereof.

4. The method of claim 1, wherein the CNTs are selected from the group consisting of SWNTs, MWNTs, carbon nanofibers, and combinations thereof.

5. The method of claim 1, wherein the mixing is carried out in a solvent.

6. The method of claim 5, wherein the solvent is removed after mixing via vacuum drying.

7. The method of claim 5, wherein the polymer nanocomposite is isolated by precipitation in a non-solvent followed by drying.

8. The method of claim 1, wherein the mixing is carried out in an apparatus selected from the group consisting of a blending apparatus, a single-screw extruder, a twin-screw extruder, an injection molder, and combinations thereof.

9. The method of claim 1, wherein the mixing is used to prepare a masterbatch followed by drawdown to a necessary composition.

10. The method of claim 1, wherein the mixing is carried out at a temperature of from about −100° C. to about 400° C.

11. The method of claim 2, wherein the amount of functionalized CNTs mixed with the polymer is from about 0.0001 weight percent to about 90 weight percent of the weight of the resulting composite.

12. The method of claim 1, wherein the surfactant interacts with the CNTs with Lewis-acid/Lewis-base interactions.

13. The method of claim 1, wherein the resulting polymer nanocomposites comprise electrical percolation at CNT loadings ranging from about 0.0005 to about 40.0 wt % CNT.

14. The method of claim 1, wherein the resulting polymer nanocomposites is a randomly oriented polymer-carbon nanotube material with geometric percolation at CNT loadings ranging from about 0.0005 to about 40.0 wt % CNT.

15. The method of claim 1, further comprising a step of using the polymer nanocomposite in a manner selected from the group consisting of drug delivery, scaffolding to promote cellular tissue growth and repair, fiber applications, bulk applications, ablation resistant applications, automobile applications, high temperature/high pressure applications, and combinations thereof.

16. A polymer nanocomposite comprising:
a) CNTs;
b) a polymer matrix in which the CNTs are dispersed, wherein the polymer matrix comprises polymers selected from the group consisting of poly($\epsilon$-caprolactone); poly($\gamma$-caprolactone); nylon 6; nylon 66; nylon 6-10; nylon 11; nylon 12; poly(lactic acid); poly(glycolic acid); copolymers of lactic and glycolic acid, and other polyamides and polyesters; polyethelether ketone (PEEK); polyetherimide (PEI); polyimides; polyamidimide; polyphenylene sulfide (PPS); polysulfone; polyvinylidene fluoride (PVDF); and combinations thereof; and
c) a compatibilizing zwitterionic surfactant, wherein said zwitterionic surfactant comprises chemical groups capable of establishing simultaneous interactions with both the CNTs and the polymer, wherein the interactions are selected from the group consisting of ionic interactions, electrostatic interactions, hydrogen bonding interactions, covalent interactions, physiochemical interactions, Lewis-acid/Lewis-base interactions, and combinations thereof.

17. The polymer nanocomposite of claim 16, wherein at least some of the CNTs are functionalized in a manner selected from the group consisting of sidewall functionalization, end functionalization, and combinations thereof.

18. The polymer nanocomposite of claim 16, wherein the CNTs are selected from the group consisting of purified CNTs, unpurified CNTs, and combinations thereof.

19. The polymer nanocomposite of claim 16, wherein the CNTs are selected from the group consisting of SWNTs, MWNTs, carbon nanofibers, and combinations thereof.

20. The polymer nanocomposite of claim 17, wherein the amount of functionalized CNTs is from about 0.0001 weight percent to about 90 weight percent of the weight of the resulting nanocomposite.

21. The polymer nanocomposite of claim 16, wherein the surfactant interacts with the CNTs with Lewis-acid/Lewis-base interactions.

22. The polymer nanocomposite of claim 16, wherein the nanocomposite comprises an electrical percolation at CNT loadings ranging from about 0.0005 to about 40.0 wt % CNT.

23. The polymer nanocomposite of claim 16, wherein the nanocomposite is a randomly oriented polymer-carbon nanotube material with geometric percolation at CNT loadings ranging from about 0.0005 to about 40.0 wt % CNT.

24. The polymer nanocomposite of claim 16, wherein the polymer nanocomposite is used in a manner selected from the group consisting of drug delivery, scaffolding to promote cellular tissue growth and repair, fiber applications, bulk applications, ablation resistant applications, automobile applications, high temperature/high pressure applications, and combinations thereof.

25. The method of claim 1, wherein the zwitterionic surfactant is an amine based surfactant comprising one or more amine headgroups.

26. The method of claim 25, wherein the zwitterionic surfactant is 12-aminododecanoic acid.

27. The method of claim 1, wherein the polymer is poly($\epsilon$-caprolactone).

28. The polymer nanocomposite of claim 16, wherein the zwitterionic surfactant is an amine based surfactant comprising one or more amine headgroups.

29. The polymer nanocomposite of claim 28, wherein the zwitterionic surfactant is 12-aminododecanoic acid.

30. The polymer nanocomposite of claim 16, wherein the polymer is poly($\epsilon$-caprolactone).

* * * * *

UNITED STATES PATENT AND TRADEMARK OFFICE
CERTIFICATE OF CORRECTION

PATENT NO. : 8,455,583 B2  Page 1 of 1
APPLICATION NO. : 11/659407
DATED : June 4, 2013
INVENTOR(S) : Krishnamoorti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this
Eighth Day of September, 2015

Michelle K. Lee
*Director of the United States Patent and Trademark Office*